United States Patent [19]
Parr

[11] 3,780,693
[45] Dec. 25, 1973

[54] VISIBLE FLUID PRESSURE INDICATOR

[76] Inventor: Edward L. Parr, 301 N. Cuyamaca, El Cajon, Calif. 92020

[22] Filed: May 15, 1972

[21] Appl. No.: 253,545

[52] U.S. Cl. .................... 116/70, 73/146.8, 73/410, 73/419, 92/34, 116/34
[51] Int. Cl. .......................................... G01l 19/12
[58] Field of Search ................. 116/34, 70, 65, 114; 73/419, 409, 410, 146.8; 92/34, 36

[56] References Cited
UNITED STATES PATENTS

| | | | |
|---|---|---|---|
| R24,710 | 10/1959 | Yowell et al. | 92/34 |
| 1,774,437 | 8/1930 | Heise | 92/34 |
| 3,224,264 | 12/1965 | Becciani et al. | 73/146.8 |
| 3,380,427 | 4/1968 | Rubin | 116/34 R |
| 3,452,708 | 7/1969 | Richardson | 116/34 R |

Primary Examiner—Louis J. Capozi
Attorney—Carl R. Brown and Neil F. Martin

[57] ABSTRACT

An indicator including a casing having a coupling connected with a source of fluid and a cap for the coupling, the cap having a window. The indicator also includes a closed, expansible and contractible container that is disposed within the cap, part of the container being visible through the window.

4 Claims, 3 Drawing Figures

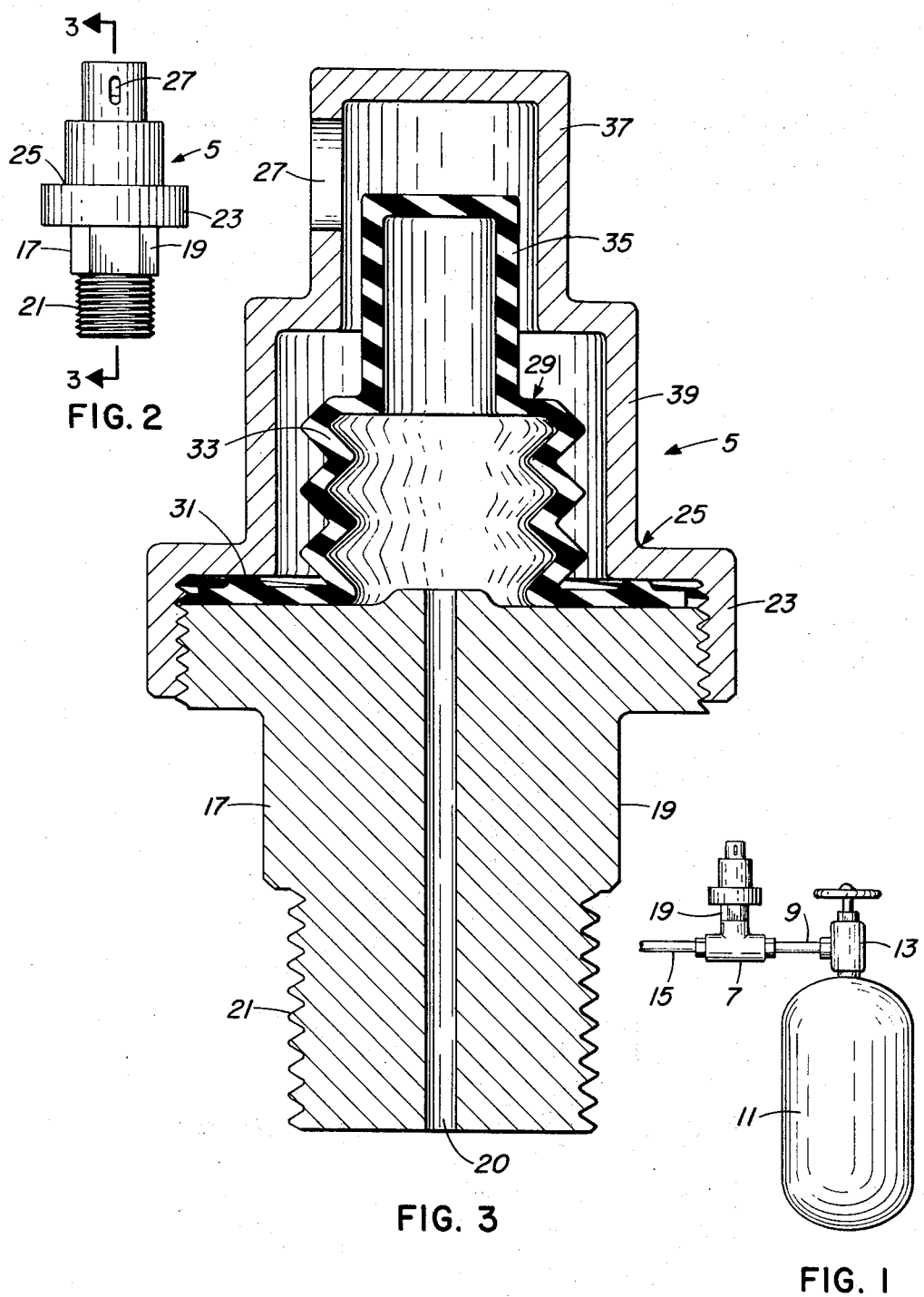

VISIBLE FLUID PRESSURE INDICATOR

BACKGROUND OF THE INVENTION

1. Field of the Invention

The invention is directed to fluid pressure indicators.

2. Description of the Prior Art

The prior art pressure indicators known to applicant are relatively complicated, relatively expensive to make and relatively difficult to interpret.

SUMMARY OF THE INVENTION

The indicator comprises merely three elements; namely, a coupling which is connectible with a source of fluid; an elongated cap having one end thereof attached to the coupling, the other end having a window; and a closed, expansible and contractible container disposed in the cap, one end thereof being sealed between the coupling and cap and the other end thereof being visible through the window.

Other features and the advantages of the present invention will be apparent from the following description, reference being made to the accompanying drawing wherein a preferred embodimant of the invention is illustrated.

BRIEF DESCRIPTION OF THE DRAWING

FIG. 1 is an elevational view showing the indicator attached to a source of fluid;

FIG. 2 is a side view of the indicator, shown on a scale approximately the actual size of the indicator; and FIG. 3 is a sectional view taken along line 3—3 of FIG. 2, but on a larger scale.

DESCRIPTION OF THE PREFERRED EMBODIMENT

Referring to FIG. 1, the indicator 5 is shown as attached to a coupling 7, the coupling being connected at one side by a tube 9, the latter being connected to a tank 11 via a manually controlled valve 13. The other side of coupling 7 is connected with a tube 15 that leads, for example, to a gas stove.

The indicator, per se, includes a threaded coupling 17 that is connectible with coupling 7, the coupling 17 having lands 19 for a wrench and a passage 20 connected with the interior of tube 15. As shown, the upper part of coupling 17 is threaded at 21 and the lower threaded part 23 of an elongated cap 25 is threadedly attached to the coupling 17. The upper portion of cap 25 is provided with a window 27, preferably vertically elongated.

The indicator 5 includes an expansible and contractible container 29 formed of expansible and contractible rubber or synthetic matter that has those characteristics. The container 29 includes an outwardly extending and circular flange 31 which forms a sealing gasket between the coupling 17 and the cap 25. The lower portion 33 of the container 29 is in the form of an expansible and contractible bellows. The indicator portion 35 of the container that is disposed above the bellows is smaller in diameter that the bellows.

Preferably, the bellows 33 alone is expansible and contractible since the cylindrical indicator portion is solid and has a smaller diameter than the bellows and is therefore more stable.

The indicator can be used to show a state of excessive pressure in the tube 15 or it can be used to show stages of abnormally low pressures in tube 15. The invention is particularly useful when the fluid is an ignitable gas used by campers for gas stoves and gas lights. If there is an abnormally low pressure due to a leakage in the gas tube 15, the bellows 33 will contract and the indicator portion 35 will fall below the window and, therefore, it is no longer visible. Under such circumstances, the indicator portion 35 is visible when the pressure is normal in tube 15.

Since the indicator portion 35 is smaller in diameter than the upper portion 37 of cap 25, portion 35 is also smaller in diameter than the lower portion 39 that surrounds the bellows. The upper portion being smaller in diameter, the indicator portion 35 is closer to the window 27 whereby the portion 35 is readily visible.

When the indicator is used for indicating abnormally low pressure, the indicator portion 35 is colored a bright color such as bright green. When it is used as an indicator for excessively high pressure, the indicator portion 35 bears a bright red color.

One of the other uses of the indicator is to determine if there is leakage along the gas-supplying tube. To determine this, the valve leading to the stove or lamps is closed. Then gas is admitted to the tube 9, the indicator 5 and tube 15 by opening valve 13. The valve 13 is maintained open until the indicator portion 35 can be seen through the window 27. Then valve 13 is closed. Should there be a leakage in the tube 15, then the indicator portion 35 will recede and cannot be seen through the window 27.

From the foregoing it is apparent that I have provided a simple, inexpensive and readily interpreted indicator. It includes only three elements, the coupling 17, the cap 25 and the expansible and contractible container 29.

Having described my invention, I claim:

1. A visible fluid pressure indicator comprising in combination:

A. a casing including:
   1. a coupling formed of light-impervious material adapted to be attached to a source of fluid, said coupling having a passage in open communication with the source of fluid,
   2. an elongated cap having the lower end attached to the coupling and having a vertically elongated window adjacent the other end thereof;

B. a closed, expansible and contractible container in open communication with the passage in the coupling, the upper portion only of the container being disposed to be visible through the window in the cap.

2. A visible fluid pressure indicator as defined in claim 1, characterized in that the container includes a flange, said coupling and cap being in sealing relationship with the flange.

3. A visible fluid pressure indicator as defined in claim 2, characterized in that the container includes a lower bellows portion and an indicating portion forming a closed and solid upper end of the container and having a diameter that is smaller than the diameter of the bellows.

4. A visible fluid pressure indicator as defined in claim 3, characterized in that the portion of the cap having the window is of smaller diameter than the portion surrounding the bellows.

* * * * *